United States Patent
Hirschmann, Jr. et al.

(10) Patent No.: US 7,182,991 B1
(45) Date of Patent: Feb. 27, 2007

(54) METHOD OF PROVIDING ELECTRIC ARC FLASH PROTECTION AND FABRIC STRUCTURES IN ACCORDANCE THEREWITH

(75) Inventors: Jack B. Hirschmann, Jr., New Bedford, MA (US); Thomas E. Neal, Guilford, CT (US)

(73) Assignee: Paramount Corp., New Bedford, MA (US)

( * ) Notice: Subject to any disclaimer, the term of this patent is extended or adjusted under 35 U.S.C. 154(b) by 235 days.

(21) Appl. No.: 10/847,426

(22) Filed: May 17, 2004

(51) Int. Cl.
*B32B 33/00* (2006.01)
*B32B 5/26* (2006.01)
*D06C 11/00* (2006.01)
*D03D 15/12* (2006.01)

(52) U.S. Cl. .................... 428/86; 428/91; 428/920; 428/921; 442/239; 442/243; 442/301

(58) Field of Classification Search ................. 428/91, 428/920, 921; 442/239, 243, 301
See application file for complete search history.

(56) References Cited

U.S. PATENT DOCUMENTS

| | | | | |
|---|---|---|---|---|
| 5,694,981 | A * | 12/1997 | Stanhope et al. | 139/383 R |
| 2003/0157315 | A1* | 8/2003 | Green | 428/317.9 |
| 2004/0200539 | A1* | 10/2004 | Shteiyer | 139/391 |

* cited by examiner

*Primary Examiner*—Jenna Befumo
(74) *Attorney, Agent, or Firm*—Altman & Martin; Steven K. Martin

(57) ABSTRACT

A method and fabric structure that employs a napped fabric to protect a subject from an arc flash. At least one napped fabric layer with an increase in fabric thickness due to napping of at least 35% is incorporated into a normal arc protective fabric structure to increase $E_{BT}$ by at least 8%.

5 Claims, 2 Drawing Sheets

METHOD OF PROVIDING ELECTRIC ARC FLASH PROTECTION AND FABRIC STRUCTURES IN ACCORDANCE THEREWITH

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to electrical safety products, more particularly, to methods, fabric structures, and assemblages for providing an arc flash barrier between workers and electrical equipment.

2. Description of the Related Art

Flame resistant (FR) clothing and blankets are used by electrical workers and electricians to protect themselves from exposure to the thermal effects of an electric arc flash. The heat from an electric arc flash can be extremely intense and is accompanied by a shock wave due to the rapid heating of the air and gases in the vicinity of the arc flash.

Protective clothing systems called arc flash suits have been developed to protect workers who may be exposed to an arc flash. Suits are designed to provide protection for various levels of exposure. The combination of radiant and convective heat and the shock wave can cause breakopen of the FR fabrics in an arc flash suit as well as heat transmission through the suit to the wearer. Breakopen is defined as the creation of holes, tears, or cracks in the exposed fabric such that incident energy is no longer effectively blocked by the fabric and passes to surfaces below the fabric. Breakopen in the ASTM F1959 test method is defined as a hole in the fabric specimen with an area greater than 0.5 square inch or a crack in any dimension greater than 1 inch in length. Arc flash suits are tested according to ASTM F1959-99 and assigned an arc rating based on the level of protection that the suit can provide. The arc rating is specified as heat energy per unit area using units of calories per square centimeter (cal/cm$^2$) and is defined using one of two criteria, which ever occurs at the lower incident heat energy. The first criteria is the level of incident heat energy from an arc exposure that would cause a 50% probability of a second degree burn injury for the wearer. This is expressed as the arc thermal performance value (ATPV). The second criteria is the level of incident heat energy from an arc exposure at which breakopen of all the FR fabric layers in the system is just beginning to occur. This is expressed as the breakopen threshold energy ($E_{BT}$).

Arc flash suits with moderate to high arc ratings of protection from 25 cal/cm$^2$ to over 100 cal/cm$^2$ are comprised of multiple layers of FR fabrics. FR fabrics include flame retardant treated cotton fabrics and cloth woven from yarns containing predominantly a para-aramid fiber, such as Dupont's KEVLAR®, and/or a meta-aramid fiber, such as Dupont's NOMEX®. Greater protection requires more fabric layers, with a proportionate increase in garment weight, discomfort, necessary storage space, and cost.

Arc protective blankets and curtains provide secondary protection for workers and equipment. The blanket or curtain is hung between the equipment that is recognized to have significant arc hazards or equipment that is being worked on and the individual and/or other areas to be protected. These blankets are composed of one or more layers of FR fabrics, the number of layers and type of fabric determining the amount of protection provided. As with the arc flash suits, the greater the protection provided, the greater the blanket weight, necessary space, and cost.

BRIEF SUMMARY OF THE INVENTION

An object of the present invention is to provide a method and fabric structure for use in arc flash protective garments and blankets that provides a greater protection-to-weight ratio than those of the prior art.

The present invention is a method of employing a napped fabric to protect a subject from an arc flash. It has been discovered that a fabric structure with at least one napped surface increases the resistance to breakopen to a higher level than the same structure without a napped surface. An increase in fabric thickness due to napping of at least 35% is necessary provide an increase in protection significant enough to warrant the extra cost associated with the napping process.

A number of fabric structures were tested, including two layer structures with one and two napped surfaces and a three layer structure with three napped surfaces. In all cases $E_{BT}$, the energy at which the fabric begins to exhibit breakopen, increased by at least 8% and by as much as 33%.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

One aspect of the present invention is a method of protecting a subject from the heat generated by an electric arc flash. Another aspect of the present invention is a fabric structure for use in electric arc flash protective garments and blankets that has a higher protection-to-weight ratio than fabric structures of the prior art. The structure of the present invention has two or more layers of FR fabric where at least one layer is an FR fabric napped on at least one surface. In a napped fabric, fiber ends extend from the basic fabric structure to the fabric surface. The napping process raises the surface fibers by passing the fabric over rapidly revolving cylinders covered with metal points or teasel burrs.

Figure 1:
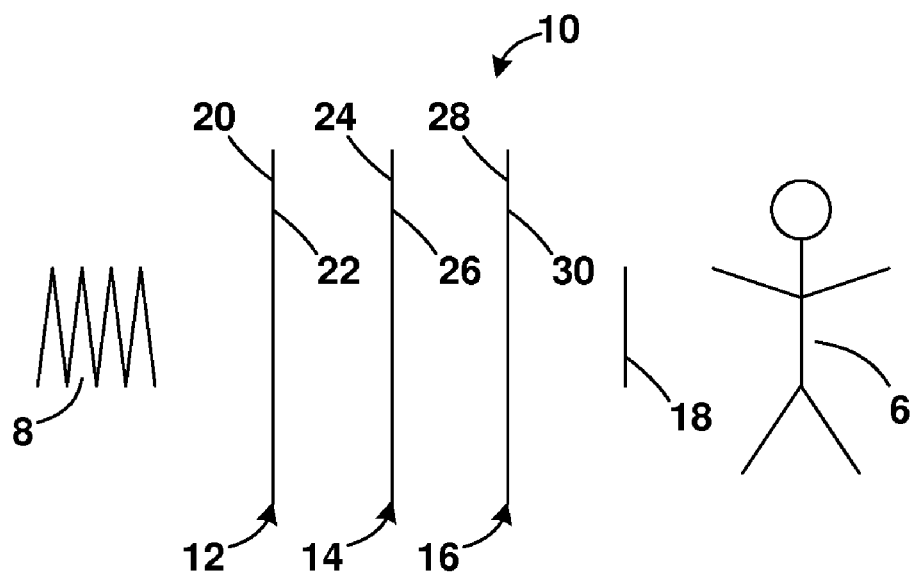
FIG. 1 is an orientation drawing of a multi-layer fabric structure of the present invention.

FIG. 1 shows how elements of the present invention are identified in the present specification. The fabric structure 10 of the present invention is interposed between the arc flash 8 and the subject 6, where the subject 6 is a person or another object being protected. The fabric layer closest to the arch flash 8 is the proximal layer 12. The fabric layer farthest from the arc flash 8 is the distal layer 16. Any fabric layers between the proximal layer 12 and distal layer 16 are the center layers 14. Similarly, the surface of a fabric layer closest to the arc flash is the proximal surface 20, 24, 28 and the surface of a fabric layer farthest from the arc flash is the distal surface 22, 26, 30. For some of the examples described below, there is a 100% cotton T-shirt knit fabric 18 between the fabric structure 10 and the subject 6 in the position where underwear would be worn. This cotton fabric 18 is not an element of the present invention.

Surprisingly, it has been discovered that a fabric structure that includes a fabric with at least one napped surface exhibits a higher resistance to breakopen than the same structure without a napped surface. The result is surprising because the napping process breaks some of the fibers on the fabric surface and one would think that napping would weaken the fabric and make it break open more easily. Just the opposite occurred: the exposure energy required to break the fabric open increased for the fabric structures employing the napped fabric. It is believed that this occurs because the napped surface insulates or shields the woven portion of the napped fabric layer from the heat exposure of the arc flash, possibly due to the trapped air in the added thickness and insulation of the napped surface and/or to the covering of the minute areas between the interfacings of the warp and the fill.

The present invention acknowledges that it is not necessary to nap the entire area of a fabric surface. This is particularly true where some portions of the fabric layer do not provide protection, that is, those portions of a fabric layer that do not lie between the arc flash and the subject. Consequently, references to napped fabrics and surfaces in the present specification are understood to mean at least those portions of the fabric layers and surfaces that lie between the arc flash and the subject.

As described above, the napping process raises fiber ends extending from the basic fabric structure with metal points or teasel burrs. There is no industry standard quantitative scale for characterizing a nap. Consequently, the napping parameters are described herein by the increase in thickness and weight of the pre-napping fabric resulting from the napping process. Thickness is determined according to ASTM D1777-96 (2002), "Standard Test Method for Thickness of a Textile Material." Thickness of napped fabric is determined with the napped surface facing up.

The weight of the fabric does increase slightly during the napping process, so this also contributes to the arc rating increase. In the examples cited below, the increase in fabric weight due to napping was no greater than 2.2%. This small increase cannot account for more than a small portion of the double-digit percentage increases in protection afforded by napping that tests have measured. The observed increase in weight due to napping is not intended to be a limiting factor. Greater and/or small weight increases may be observed depending upon the amount of napping imposed on the fabric.

Materials with which both the unnapped and napped fabric layers can be composed include para-aramid fibers, such as KEVLAR®, meta-aramid fibers, such as NOMEX®, melamine fibers, such as BASOFIL®, flame retardant treated cotton fibers, carbon fibers, and flame resistant rayon fibers. The proximal layer can be composed of blends of NOMEX® and KEVLAR®, blends of KELVAR® and flame resistant rayon, blends of KEVLAR® and BASOFIL®, blends of synthetic polybenzimidazole (PBI) fiber and KEVLAR®, and blends of carbon and KEVLAR®.

The method used to attach the fabric layers together to form a fabric structure depends on the use to which the fabric structure is put. Applications of the fabric structures of the present invention include arc protective blankets, suits, gloves, hoods, etc. Methods of assembling the fabric components for each application are well-known in the art.

A number of examples of fabric structures of the present invention are described below. They were tested for compliance with accepted industry practices and desired protection capability. The examples are merely illustrative and are not intended to be exhaustive list of fabric structures contemplated by the present invention.

The examples use the following measurements: (1) Arc Thermal Performance Value (ATPV) (linear) is the arc rating at which there is a 50% probability of a burn injury as determined by linear regression; (2) E(BT) or $E_{BT}$ is the energy at which the fabric begins to exhibit breakopen showing holes greater than 0.5 in$^2$ or an opening greater than 1 inch long in any dimension as determined by calculating the average of the five highest incident heat values which did not exhibit breakopen; and (3) $E_{50}$ is the energy at which there is a 50% probability of breakopen of all of the flame resistant layers. All values are in calories/cm$^2$.

The data obtained from tests of the example structures leads to the conclusion that a fabric structure of one or more fabric layers where at least one surface of at least one fabric layer is napped provides an increase in arc flash protection over the same structure without a napped surface.

The napped fabrics employed by the present invention have at least a moderate level of napping, characterized by a napped surface which appears as a fibrous matt or a fleece, and where the weave pattern of warp and fill yarns is not visible on the napped surface.

The minimum increase in thickness due to napping that provides an increase in protection significant enough to warrant the extra cost associated with the napping process was determined using a fabric layer composed of a 4.8 oz/yd$^2$, undyed blend of 75% T450, 2×51 mm denier meta-aramid (NOMEX®) and 25% 2.2 denier para-aramid (KEVLAR®). It has a 16/1 cotton count yarn in both warp and fill, a 3×2 twill weave, 57 ends/inch in warp and 46 ends/inch in fill, and a breaking strength of 122 lbs warp and 67 lbs fill. The fabric has an unnapped thickness of 0.019 inches. This is the fabric used in the napped layer of Example A below.

After napping and prior to testing, two sets of thickness measurements were taken. The measured values ranged from 0.024 inches to 0.040 inches. The mean value of the first set was 0.028 inches and the mean value for the second set was 0.029 inches. The standard deviation was 0.0035 for the first set and 0.0048 for the second set. A value of one standard deviation lower than the mean yields a thickness of 0.0245 inches, which is a 30% increase over the unnapped thickness of 0.019 inches. Consequently, an increase in thickness of %35, well within one standard deviation, is considered to be a safe lower range for the increase in thickness of the napped fabric and still provide an increase in protection significant enough to warrant the extra cost associated with the napping process. While smaller increases in thickness due to napping may not be significant enough to warrant the extra production cost, they still provide an increase in protection and are considered to be covered by the present invention.

EXAMPLE A

Unnapped Proximal Layer and Distal Layer with Napped Proximal Surface

Figures 2, 3:
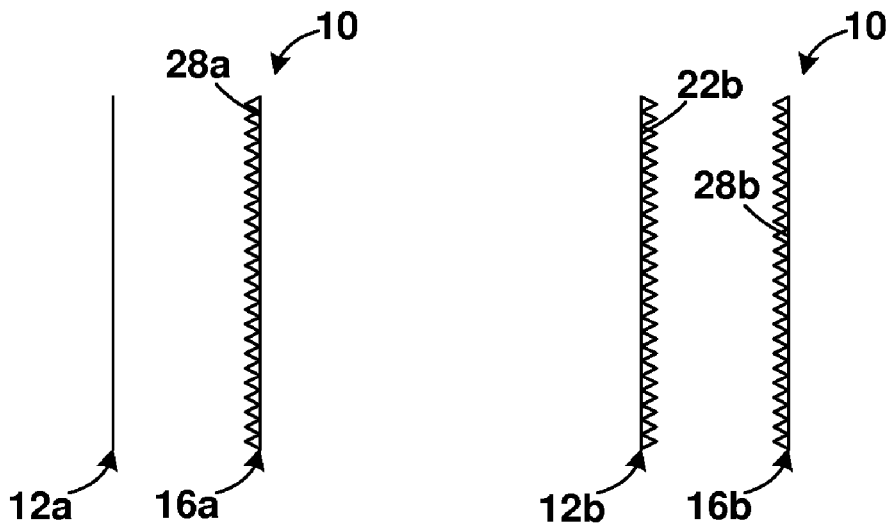
FIG. 2 is a drawing of a two-layer fabric structure of the present invention with the distal layer napped on the proximal surface.
FIG. 3 is a drawing of a two-layer fabric structure of the present invention with both layers napped on the surfaces facing each other.

This example, shown in FIG. 2, has two layers of fabric. The proximal layer 12a is composed of a 5.2 oz/yd², undyed blend of 60% 1.5 denier×48 mm para-aramid (KEVLAR®) fiber and 40% 2.5 denier×51 mm melamine (BASOFIL®) fiber. It uses a 20/1 cotton count yarn in both warp and fill. It has a 3×2 twill weave, that is, it is woven with three warp yarns over and two warp yarns under respective fill yarns, and has 76 ends/inch in warp and 65 ends/inch in fill. Breaking strength is 153 lbs warp and 111 lbs fill.

The distal layer 16a is composed of a 4.8 oz/yd², undyed blend of 75% T450, 2×51 mm denier meta-aramid (NOMEX®) and 25% 2.2 denier para-aramid (KEVLAR®). It uses a 16/1 cotton count yarn in both warp and fill. It has a 3×2 twill weave and 57 ends/inch in warp and 46 ends/inch in fill. Breaking strength is 122 lbs warp and 67 lbs fill. The proximal surface 28a has a moderate nap with the following characteristics. The increase in fabric weight due to napping is 0.1 oz/yd² from an initial unnapped fabric weight of 4.7 oz/yd², an increase of 2.1%. The increase in fabric thickness due to napping is 0.0095 inches from an unnapped thickness of 0.019 inches, an increase of 50%.

Testing determined that for this fabric structure, ATPV (linear) is 29 and $E_{50}$ is greater than 35. This compares favorably to the identical fabric structure without napping, where ATPV (linear) is 26, and $E_{50}$ is approximately 30. Comparing the results shows an increase in ATPV (linear) of 11% and an increase in $E_{50}$ of greater than 17%.

EXAMPLE B

Proximal Layer with Napped Distal Surface and Distal Layer with Napped Proximal Surface This example, shown in FIG. 3, has two layers of napped fabric. The proximal layer 12b is composed of a 5.3 oz/yd², undyed blend of 60% 1.5 denier×48 mm para-aramid (KEVLAR®) fiber and 40% 2.5 denier×51 mm melamine (BASOFIL®) fiber. It uses a 20/1 cotton count yarn in both warp and fill. It has a 3×2 twill weave and has 76 ends/inch in warp and 65 ends/inch in fill. Breaking strength is 109 lbs warp and 72 lbs fill. The distal surface 22b has a moderate nap with the following characteristics. The increase in fabric weight due to napping is 0.1 oz/yd² from an initial unnapped fabric weight of 5.2 oz/yd², a 1.9% increase. The increase in fabric thickness due to napping is 0.0105 inches from an unnapped thickness of 0.017 inches, an increase of 62%.

The distal layer 16b is composed of a 4.8 oz/yd², undyed blend of 75% T450, 2×51 mm denier meta-aramid (NOMEX®) fiber and 25% 2.2 denier para-aramid (KEVLAR®) fiber. It uses a 16/1 cotton count yarn in both warp and fill. It has a 3×2 twill weave and 57 ends/inch in warp and 46 ends/inch in fill. Breaking strength is 122 lbs warp and 67 lbs fill. The proximal surface 28b has a moderate nap with the following characteristics. The increase in fabric weight due to napping is 0.1 oz/yd² from an initial unnapped fabric weight of 4.7 oz/yd², an increase of 2.1%. The increase in fabric thickness due to napping is 0.0095 inches from an unnapped thickness of 0.019 inches, an increase of 50%.

Testing determined that for this fabric structure, ATPV (linear) is 34 and $E_{50}$ is greater than 40. This compares favorably to the identical fabric structure without napping, where ATPV (linear) is 26 and $E_{50}$ is 30. Comparing the results shows an increase in ATPV (linear) of 31% and an increase in $E_{50}$ of greater than 33%.

EXAMPLE C

Proximal Layer with Napped Distal Surface and Unnapped Distal Layer

Figure 4:
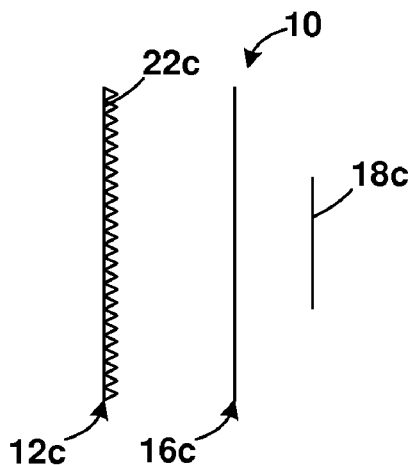
FIG. 4 is a drawing of a two-layer fabric structure of the present invention with the proximal layer napped on the distal surface.

This example, shown in FIG. 4, has two layers of fabric. In addition, there is a 5.5 oz/yd², 100% cotton T-shirt knit fabric 18c behind the distal layer 16c in the position where underwear would be worn by the subject.

The proximal layer 12c is composed of a 5.3 oz/yd², undyed blend of 60% 1.5 denier×48 mm para-aramid (KEVLAR®) fiber and 40% 2.5 denier×51 mm melamine (BASOFIL®) fiber. It uses a 20/1 cotton count yarn in both warp and fill. It has a 3×2 twill weave, and has 76 ends/inch in warp and 65 ends/inch in fill. Breaking strength is 153 lbs warp and 111 lbs fill. The distal surface 22c has a moderate nap with the following characteristics. The increase in fabric weight due to napping is 0.1 oz/yd² from an initial unnapped fabric weight of 5.2 oz/yd², a 1.9% increase. The increase in fabric thickness due to napping is 0.0105 inches from an unnapped thickness of 0.017 inches, an increase of 62%.

The distal layer 16c is composed of a 4.7 oz/yd², undyed blend of 75% T450, 2×51 mm denier meta-aramid (NOMEX®) fiber and 25% 2.2 denier para-aramid (KEVLAR®) fiber. It uses a 16/1 cotton count yarn in both warp and fill. It has a 3×2 twill weave and 57 ends/inch in warp and 46 ends/inch in fill. Breaking strength is 122 lbs warp and 67 lbs fill.

Testing determined that for this fabric structure, $E_{BT}$ is 36 and $E_{50}$ is 37. This compares favorably to the identical fabric structure without napping, where $E_{BT}$ and $E_{50}$ are approximately 30. Comparing the results shows an increase in $E_{BT}$ of greater than 20%.

EXAMPLE D

Figure 5:
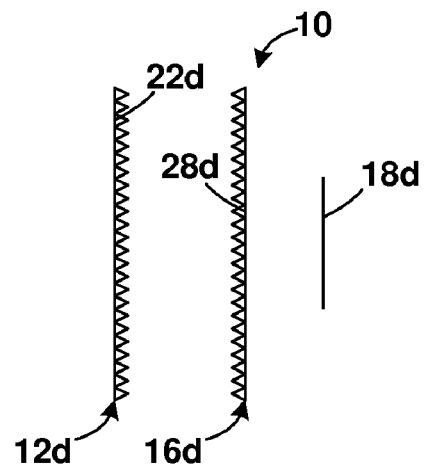
FIG. 5 is a drawing of a two-layer fabric structure of the present invention with both layers napped on the surfaces facing each other.

Proximal Layer with Napped Distal Surface and Distal Layer with Napped Proximal Surface This example, shown in FIG. 5, has two layers of napped fabric. In addition, there is a 5.5 oz/yd², 100% cotton T-shirt knit fabric 18d behind the distal layer 16d in the position where underwear would be worn by the subject.

The proximal layer 12d is composed of a 5.3 oz/yd², undyed blend of 60% 1.5 denier×48 mm para-aramid (KEV- LAR®) fiber and 40% 2.5 denier×51 mm melamine (BASO-FIL®) fiber. It uses a 20/1 cotton count yarn in both warp and fill. It has a 3×2 twill weave, and has 76 ends/inch in warp and 65 ends/inch in fill. Breaking strength is 109 lbs warp and 72 lbs fill. The distal surface 22d has a moderate nap with the following characteristics. The increase in fabric weight due to napping is 0.1 oz/yd² from an initial unnapped fabric weight of 5.2 oz/yd², a 1.9% increase. The increase in fabric thickness due to napping is 0.0105 inches from an unnapped thickness of 0.017 inches, an increase of 62%.

The distal layer 16d is composed of a 4.8 oz/yd², undyed blend of 75% T450, 2×51 mm denier meta-aramid (NOMEX®) and 25% 2.2 denier para-aramid (KEVLAR®). It uses a 16/1 cotton count yarn in both warp and fill. It has a 3×2 twill weave and 57 ends/inch in warp and 46 ends/inch in fill. Breaking strength is 122 lbs warp and 67 lbs fill. The proximal surface 28d has a moderate nap with the following characteristics. The increase in fabric weight due to napping is 0.1 oz/yd² from an initial unnapped fabric weight of 4.7 oz/yd², an increase of 2.1%. The increase in fabric thickness due to napping is 0.0095 inches from an unnapped thickness of 0.019 inches, an increase of 50%.

Testing determined that for this fabric structure, $E_{BT}$ is 40 and $E_{50}$ is 41. This compares favorably to Example C with the identical fabric structure but where only one of the two layers is napped, $E_{BT}$ is 36 and $E_{50}$ is 37. Comparing the results shows an increase in $E_{BT}$ of 11% and an increase in $E_{50}$ of 11%.

EXAMPLE E

Two Layers with Napped Distal Surfaces

Figure 6:
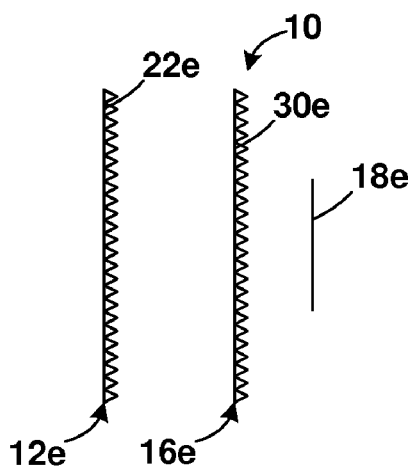
FIG. 6 is a drawing of a two-layer fabric structure of the present invention with both layers napped on the distal surfaces.

This example, shown in FIG. 6, has two layers of napped fabric. In addition, there is a 5.5 oz/yd², 100% cotton T-shirt knit fabric 18e behind the distal layer 16e in the position where underwear would be worn by the subject.

The proximal layer 12e is composed of a 5.3 oz/yd², undyed blend of 60% 1.5 denier×48 mm para-aramid (KEVLAR®) fiber and 40% 2.5 denier×51 mm melamine (BASOFIL®) fiber. It uses a 20/1 cotton count yarn in both warp and fill. It has a 3×2 twill weave, and has 76 ends/inch in warp and 65 ends/inch in fill. Breaking strength is 109 lbs warp and 72 lbs fill. The distal surface 22e has a moderate nap with the following characteristics. The increase in fabric weight due to napping is 0.1 oz/yd² from an initial unnapped fabric weight of 5.2 oz/yd², a 1.9% increase. The increase in fabric thickness due to napping is 0.0105 inches from an unnapped thickness of 0.017 inches, an increase of 62%.

The distal layer 16e is composed of a 4.8 oz/yd², undyed blend of 75% T450, 2×51 mm denier meta-aramid (NOMEX®) and 25% 2.2 denier para-aramid (KEVLAR®). It uses a 16/1 cotton count yarn in both warp and fill. It has a 3×2 twill weave and 57 ends/inch in warp and 46 ends/inch in fill. Breaking strength is 122 lbs warp and 67 lbs fill. The distal surface 30e has a moderate nap with the following characteristics. The increase in fabric weight due to napping is 0.1 oz/yd² from an initial unnapped fabric weight of 4.7 oz/yd², an increase of 2.1%. The increase in fabric thickness due to napping is 0.0095 inches from an unnapped thickness of 0.019 inches, an increase of 50%.

Testing determined that for this fabric structure, $E_{BT}$ is 39 and $E_{50}$ is 42. This compares favorably to Example C with the identical fabric structure but where only one of the two layers is napped, $E_{BT}$ is 36 and $E_{50}$ is 37. Comparing the results shows an increase in $E_{BT}$ of greater than 8% and an increase in $E_{50}$ of greater than 14%.

EXAMPLE F

Three Napped Layers with the Napped Distal Surfaces

Figure 7:
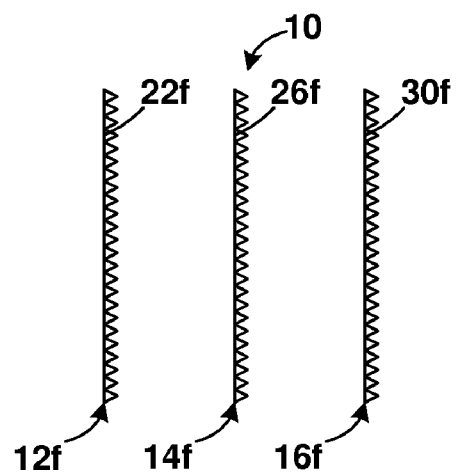
FIG. 7 is a drawing of a three-layer fabric structure of the present invention with all three layers napped on the distal surfaces.

This example, shown in FIG. 7, has three layers of napped fabric. All three layers 12f, 14f, 16f are composed of a 5.3 oz/yd², undyed blend of 60% 1.5 denier×48 mm para-aramid (KEVLAR®) fiber and 40% 2.5 denier×51 mm melamine (BASOFIL®) fiber. It uses a 20/1 cotton count yarn in both warp and fill. It has a 3×2 twill weave and 76 ends/inch in warp and 65 ends/inch in fill. Breaking strength is 109 lbs warp and 72 lbs fill. The distal surface 22f, 26f, 30f of all three layers 12f, 14f, 16f has a moderate nap with the following characteristics. The increase in fabric weight due to napping is 0.1 oz/yd² from an initial unnapped fabric weight of 5.2 oz/yd², a 1.9% increase. The increase in fabric thickness due to napping is 0.0105 inches from an unnapped thickness of 0.017 inches, an increase of 62%.

Testing determined that for this structure, ATPV (linear) is 61, $E_{BT}$ is 58, and $E_{50}$ is 76 cal/cm². These results compare to the identical three-layer fabric structure without napping, with an fabric weight of 5.20 oz/yd² for each layer where ATPV (linear) is 44, $E_{BT}$ is 44, and $E_{50}$ is 68 cal/cm². Comparing the results shows an increase in ATPV (linear) of 39%, an increase in $E_{BT}$ of 32%, and an increase in $E_{50}$ of 12%.

Thus it has been shown and described a method and fabric structures and assemblages which satisfy the objects set forth above.

Since certain changes may be made in the present disclosure without departing from the scope of the present invention, it is intended that all matter described in the foregoing specification and shown in the accompanying drawings be interpreted as illustrative and not in a limiting sense.

We claim:

1. A fabric structure for use in electrical arc flash protective articles comprising:
   (a) a first flame resistant fabric layer with a weave structure of warp and fill yarns; and
   (b) a second flame resistant fabric layer with a weave structure of warp and fill yarns, a surface of said second fabric layer being napped such that said second fabric weave structure is not visible, said second fabric layer being attached to said first fabric layer such that said napped surface is between said first fabric layer and said second fabric layer.

2. The fabric structure of claim 1 wherein said napping increases the thickness of said second fabric layer by at least 35%.

3. The fabric structure of claim 1 wherein at least one surface of said first fabric layer is napped such that said first fabric weave structure is not visible.

4. The fabric structure of claim 3 wherein said napping increases the thickness of said first fabric and said second fabric by at least 35%.

5. The fabric structure of claim 1 further comprising one or more additional flame resistant fabric layers attached between said first and second fabric layers.

* * * * *